(12) United States Patent
Fuss et al.

(10) Patent No.: US 6,270,265 B1
(45) Date of Patent: Aug. 7, 2001

(54) FILM-ENGAGING SPROCKET DRIVE

(75) Inventors: Timothy J. Fuss, Rochester; Dennis R. Zander, Penfield, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/478,488

(22) Filed: Jan. 6, 2000

(51) Int. Cl.$^7$ ..................................... G03B 1/24
(52) U.S. Cl. .............................. 396/411; 226/76; 242/354
(58) Field of Search .................................. 396/411, 387; 242/354, 354.1, 354.2; 226/87, 76

(56) References Cited

U.S. PATENT DOCUMENTS

| | | | |
|---|---|---|---|
| 649,563 | 5/1900 | Willson | 474/153 |
| 717,976 | 1/1903 | Dodge | 474/163 |
| 742,812 | 10/1903 | Winton | 74/333 |
| 1,744,576 | 1/1930 | Rhett | 74/461 |
| 2,161,913 | 6/1939 | Doyle | 474/163 |
| 2,351,999 | 6/1944 | Nerwin | 396/396 |
| 4,087,165 | * 5/1978 | Pasturczak et al. | 226/76 X |
| 4,437,749 | * 3/1984 | Ehgartner et al. | 396/411 |
| 6,137,962 | * 10/2000 | Namai | 395/411 |

* cited by examiner

Primary Examiner—W. B. Perkey
(74) Attorney, Agent, or Firm—Roger A. Fields (57) ABSTRACT

A film-engaging sprocket drive for use with an edge-perforated filmstrip having successive uniform-pitch film perforations includes a set of two coaxial sprocket wheels each having a series of uniform-pitch film-engaging teeth that are similarly shaped to engage the filmstrip within the film perforations and that are arranged in successive pairs of one tooth from one sprocket wheel and another tooth from the other sprocket wheel. The sprocket wheels each are rotatable relative to the other to similarly increase the pitch of the two teeth in the respective pairs of teeth to greater than the pitch of the film perforations. A return spring is arranged to rotate one sprocket wheel relative to the other sprocket wheel to decrease the pitch of the two teeth in the respective pairs of teeth substantially to the pitch of the film perforations.

14 Claims, 8 Drawing Sheets

FILM-ENGAGING SPROCKET DRIVE

FIELD OF THE INVENTION

The invention relates generally to the field of photography, and in particular to a film engaging sprocket drive preferably for use in a camera.

BACKGROUND OF THE INVENTION

Figure 12:
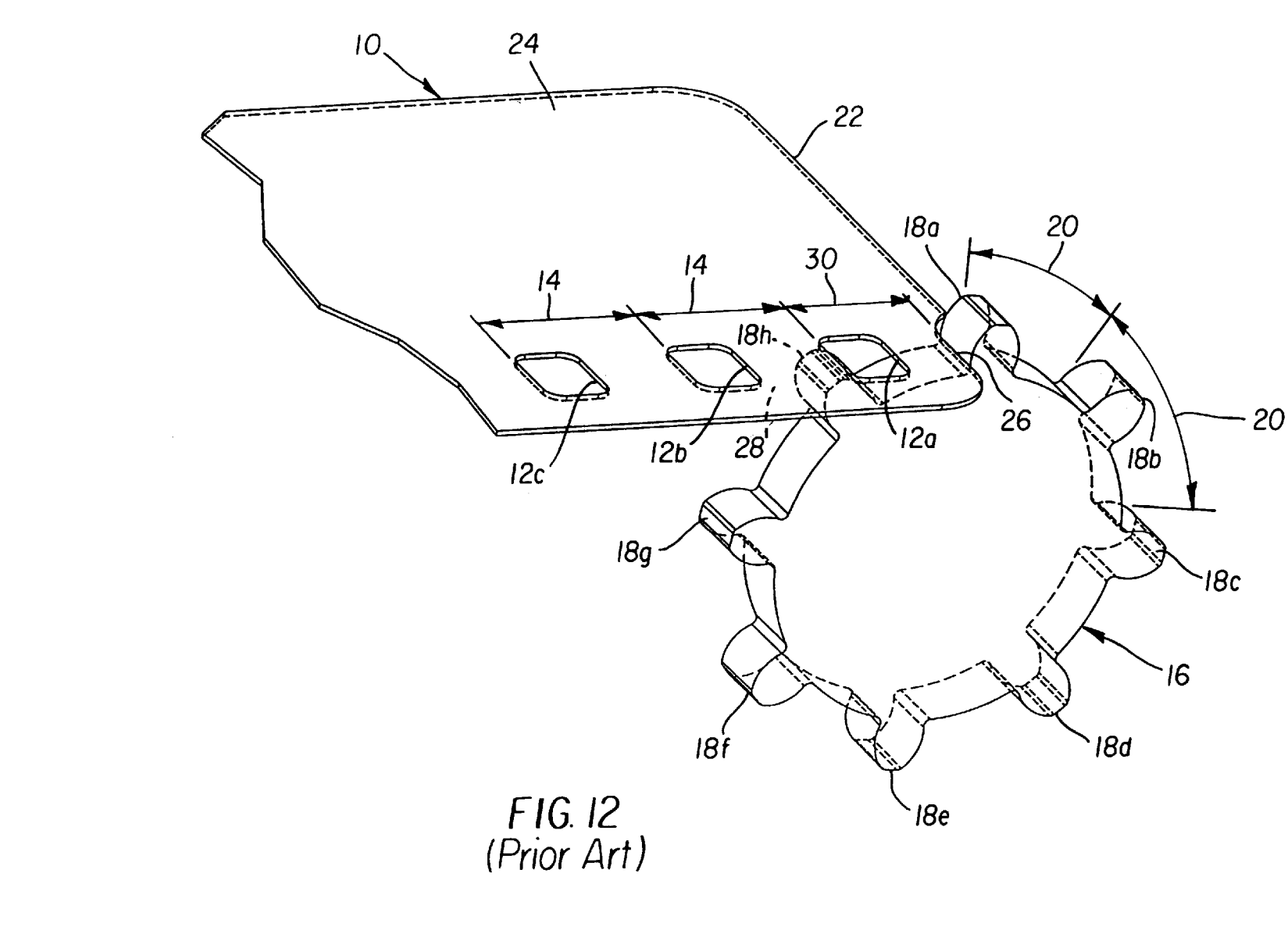
FIG. 12 (Prior Art) is a rear perspective view of a prior art sprocket wheel.

As shown in FIG. 12 (Prior Art), a typical edge-perforated 35 mm filmstrip 10 has successive evenly-spaced film perforations 12a, 12b, 12c, etc. The pitch 14 of the film perforations 12a, 12b, 12c . . . from one perforation to the next perforation is uniform (the same) as indicated in FIG. 12, and as is commonly understood it is the distance between one point on a film perforation and a corresponding point on the next perforation.

A typical film-engaging sprocket drive includes a single sprocket wheel 16 having a series of eight successive uniform-pitch film-engaging teeth 18a, 18b, 18c, 18d, 18e, 18f, 18g, 18h that are similarly shaped to engage the filmstrip 12 within the film perforations 12a, 12b, 12c, etc. The teeth 18a, 18b, 18c, 18d, 18e, 18f, 18g, 18h are spaced 45° apart, and the pitch 20 of the teeth is substantially the same as the pitch 14 of the film perforations 12a, 12b, 12c . . . to permit the teeth to enter the film perforations.

Problems

If the leading or forward edge 22 of an integral film leader 24 of the filmstrip 10 has a relieved edge portion 26 that is directly forward of the film perforations 12a, 12b, 12c . . . as shown in FIG. 12, then when the film leader 24 is longitudinally advanced to the right in FIG. 12 and against the tooth 18a of the sprocket wheel 16, the sprocket wheel will be rotated clockwise in FIG. 12 to swing the immediately preceding tooth 18h against an underside section 28 of the film leader 24 between the first available (initial) perforation 12a and the second available perforation 12b. The tooth 18h is swung against the underside section 28 of the filmstrip 10 because the distance 30 between the relieved edge portion 26 and the first available perforation 12a is less than the pitch 14 of the film perforations 12a, 12b, 12c . . . , i.e. it is less than the pitch 20 of the teeth 18a, 18b, 18c, 18d, 18e, 18f, 18g, 18h. Thus, the tooth 18h may not be able to enter the first or second available perforations 12a and 12b in order to engage the film leader 24, which would result in a film loading failure.

SUMMARY OF THE INVENTION

According to one aspect of the invention, a film-engaging sprocket drive for use with an edge-perforated filmstrip having successive uniform-pitch film perforations comprises:

a set of two coaxial sprocket wheels each having a series of uniform-pitch film-engaging teeth that are similarly shaped to engage the filmstrip within the film perforations and that are arranged in successive pairs of one tooth from one sprocket wheel and another tooth from the other sprocket wheel, and the sprocket wheels each are rotatable relative to the other to similarly increase the pitch of the two teeth in the respective pairs of teeth to greater than the pitch of the film perforations; and a return spring arranged to rotate one sprocket wheel relative to the other sprocket wheel to decrease the pitch of the two teeth in the respective pairs of teeth substantially to the pitch of the film perforations. A film-engaging sprocket drive that has two coaxial sprocket wheels which can be rotated relative to one another in the manner described solves the previously discussed problem that occurs with a single sprocket wheel.

According to another aspect of the invention, a method of engaging a sprocket drive with an edge-perforated filmstrip comprises:

rotating one of two identical multi-tooth sprocket wheels relative to the other sprocket wheel to position one tooth of the one sprocket wheel in a second available perforation in the filmstrip; and rotating the other sprocket wheel relative to the one sprocket wheel to position one tooth of the other sprocket wheel in a first available perforation in the filmstrip which precedes the second available perforation.

DETAILED DESCRIPTION OF THE INVENTION

The invention is disclosed as being embodied preferably in a motorized film advance camera. Because the features of this type of camera are generally well known, the description which follows is directed in particular only to those elements forming part of or cooperating directly with the disclosed embodiment. It is to be understood, however, that other elements may take various forms known to a person of ordinary skill in the art.

The Camera

Figure 1:
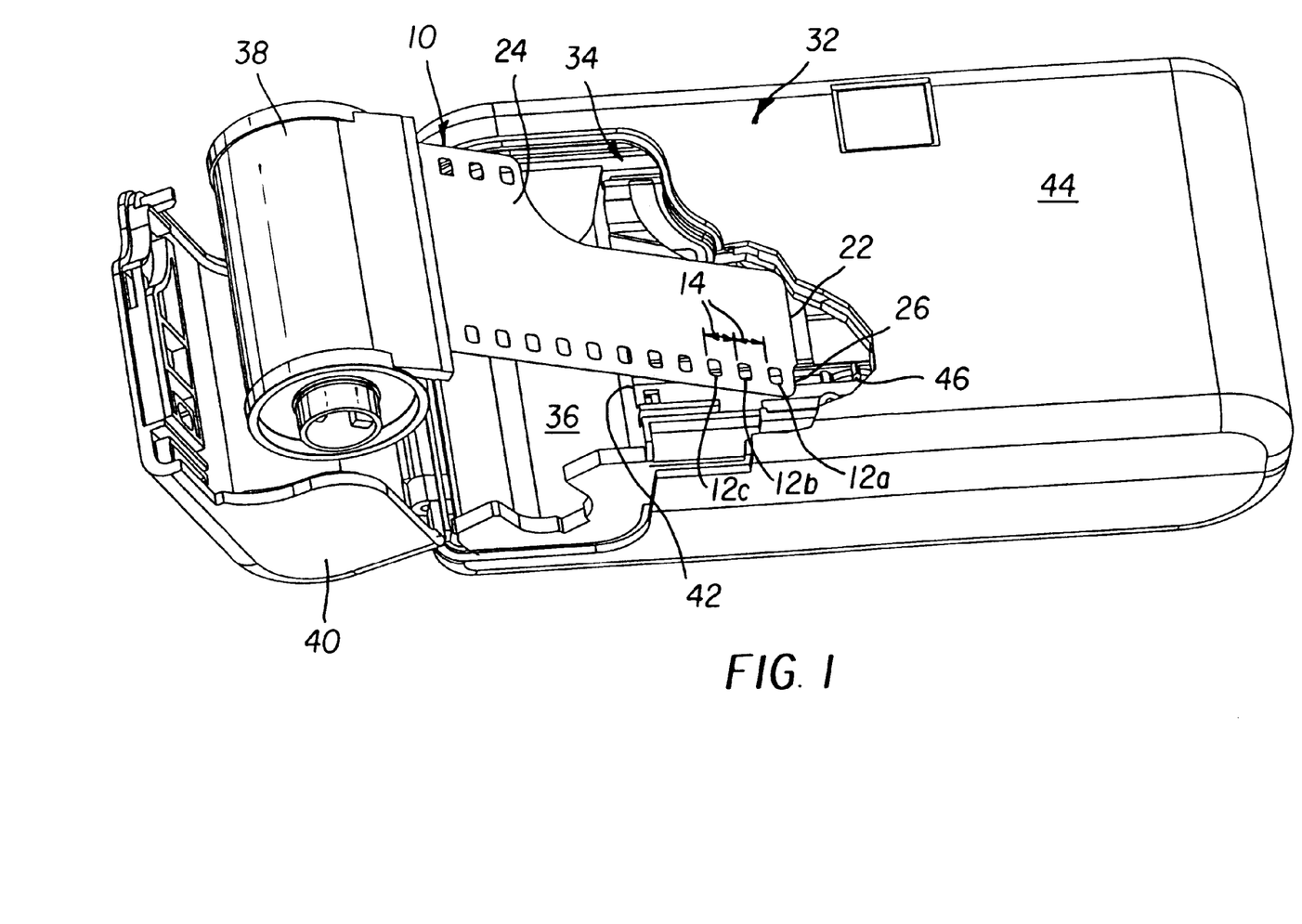
FIG. 1 is a rear perspective view of a camera that includes a film-engaging sprocket drive which is a preferred embodiment of the invention.
Figure 5:
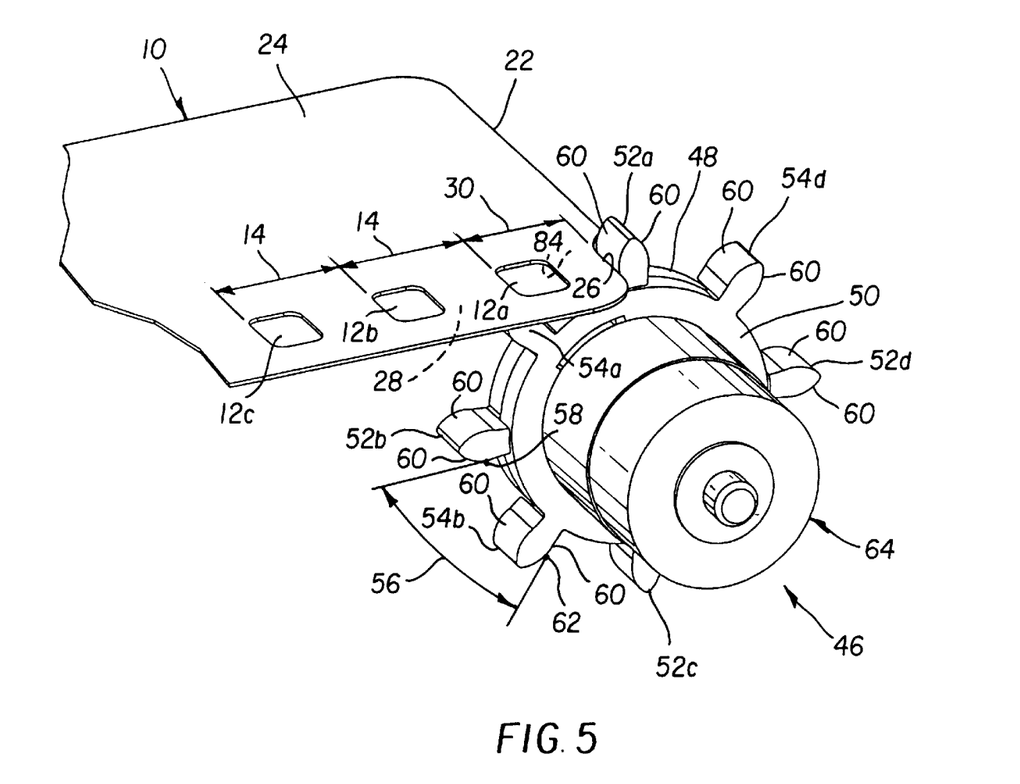
FIG. 5 is a rear perspective view of the sprocket drive as in FIG. 3, though with the addition of a film leader portion of a filmstrip.

Referring now to the drawings, FIG. 1 shows a motorized film advance camera 32 including an interior main body part 34 with a rearwardly open cartridge receiving chamber 36 for a known film cartridge 38 having a protruding film leader, which is the film leader 24 of the filmstrip 10 previously described. As previously mentioned, the filmstrip 10 beginning with its film leader 24 has successive evenly-spaced film perforations 12a, 12b, 12c, etc. The pitch 14 of the film perforations 12a, 12b, 12c . . . from one perforation to the next perforation is uniform (the same) as indicated in FIG. 5, and as is commonly understood it is the distance between one point on a film perforation and a corresponding point on the next perforation. The leading or forward edge 22 of the film leader 24 has a relieved edge portion 26 that is forward of the film perforations 12a, 12b, 12c, etc. Thus, the distance 30 between the relieved edge portion 26 and the first available (initial) perforation 12a is less than the pitch 14 of the film perforations 12a, 12b, 12c, etc.

A film door 40 is pivotally connected with the main body part 34 for opening and closing movements to uncover and re-cover the cartridge receiving chamber 36. When the film door 40 is opened as shown in FIG. 1, the film leader 24 is manually inserted through a film entry zone 42 between the main body part 34 and a rear cover part 44 including a film pressure platen (not shown), and the film cartridge 38 is placed in the cartridge receiving chamber 36. The film leader 24 is manually moved into engagement with a film-engaging sprocket drive 46 beneath the rear cover part 44. Then, when the film door 40 is manually closed, a switch (not shown) is automatically closed to motor-rotate the sprocket drive 46 in engagement with the film leader 24 to advance the film leader to a known film take-up spool in a film take-up chamber (not shown) in the main body part 34.

The Film-Engaging Sprocket Drive

Figure 10:
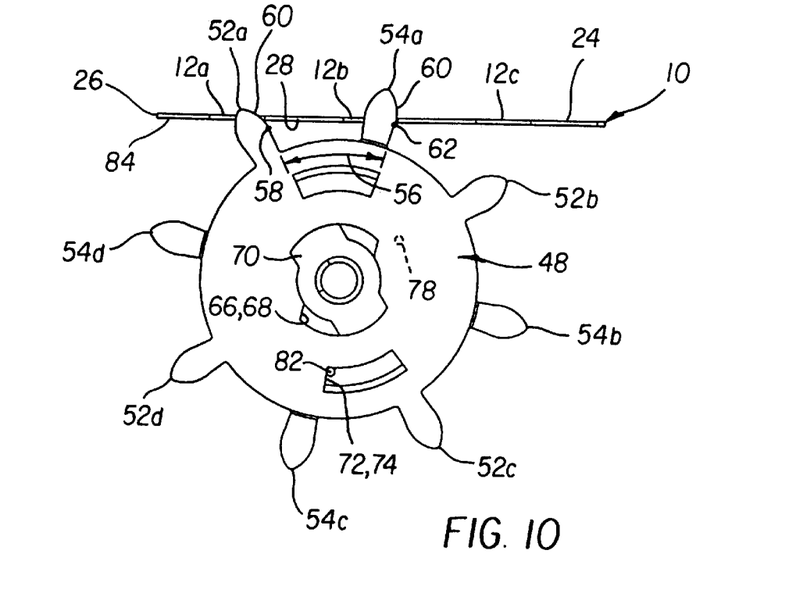
Figure 11:
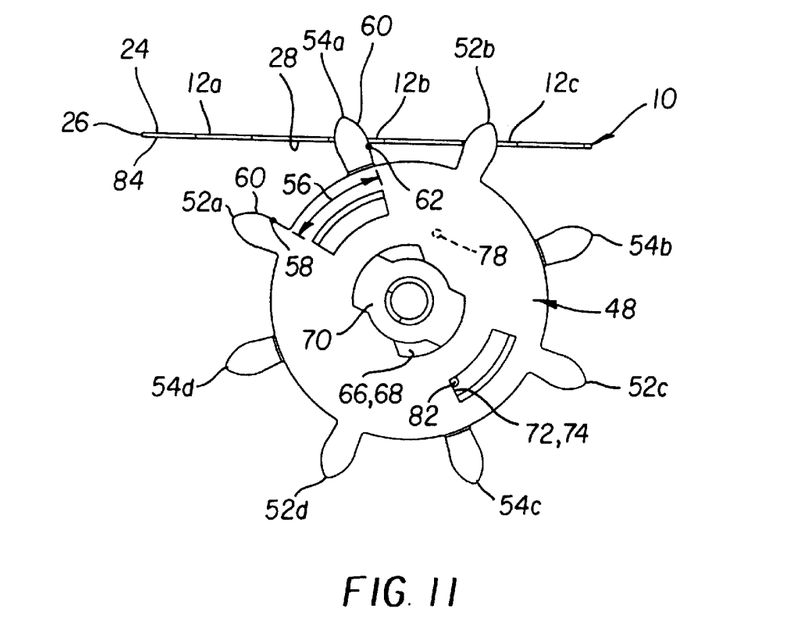

The film engaging sprocket drive 46 as shown in FIGS. 2–5 includes a set of two identical coaxial sprocket wheels 48 and 50 each having a series of four (at least partially) curved face uniform-pitch film-engaging teeth 52a, 52b, 52c, 52d and 54a, 54b, 54c, 54d that engage the filmstrip 10 within the film perforations 12a, 12b, 12c . . . and that are arranged in four successive pairs 52a–54a, 52b–54b, 52c–54c, 52d–54d of one tooth from one sprocket wheel and another tooth from the other sprocket wheel. The two teeth in the respective pairs of teeth 52a–54a, 52b–54b, 52c–54c, 52d–54d engage the film perforations 12a, 12b, 12c . . . as shown in FIG. 11. The sprocket wheels 48 and 50 each are rotatable relative to the other to similarly increase the distance 56 between a point 58 on the (at least) curved face 60 of one of the two teeth in the respective pairs of teeth 52a–54a, 52b–54b, 52c–54c, 52d–54d and a corresponding point 62 on the (at least) partially curved face 60 of the other tooth in the same pair to similarly increase the pitch (distance) 56 of the two teeth in the respective pairs of teeth to greater than the pitch 14 of the film perforations 12a, 12b, 12c, etc. This is shown in FIGS. 5–9. Conversely, the sprocket wheels 48 and 50 each are rotatable relative to the other to similarly decrease the distance 56 between the point 58 on the (at least) partially curved face 60 of one of the two teeth in the respective pairs of teeth 52a–54a, 52b–54b, 52c–54c, 52d–54d and the corresponding point 62 on the (at least) partially curved face 60 of the other tooth in the same pair to similarly decrease the pitch (distance) 56 of the two teeth in the respective pairs of teeth substantially to the pitch 14 of the film perforations 12a, 12b, 12c, etc. This is shown in FIGS. 9 and 10.

Figure 2:
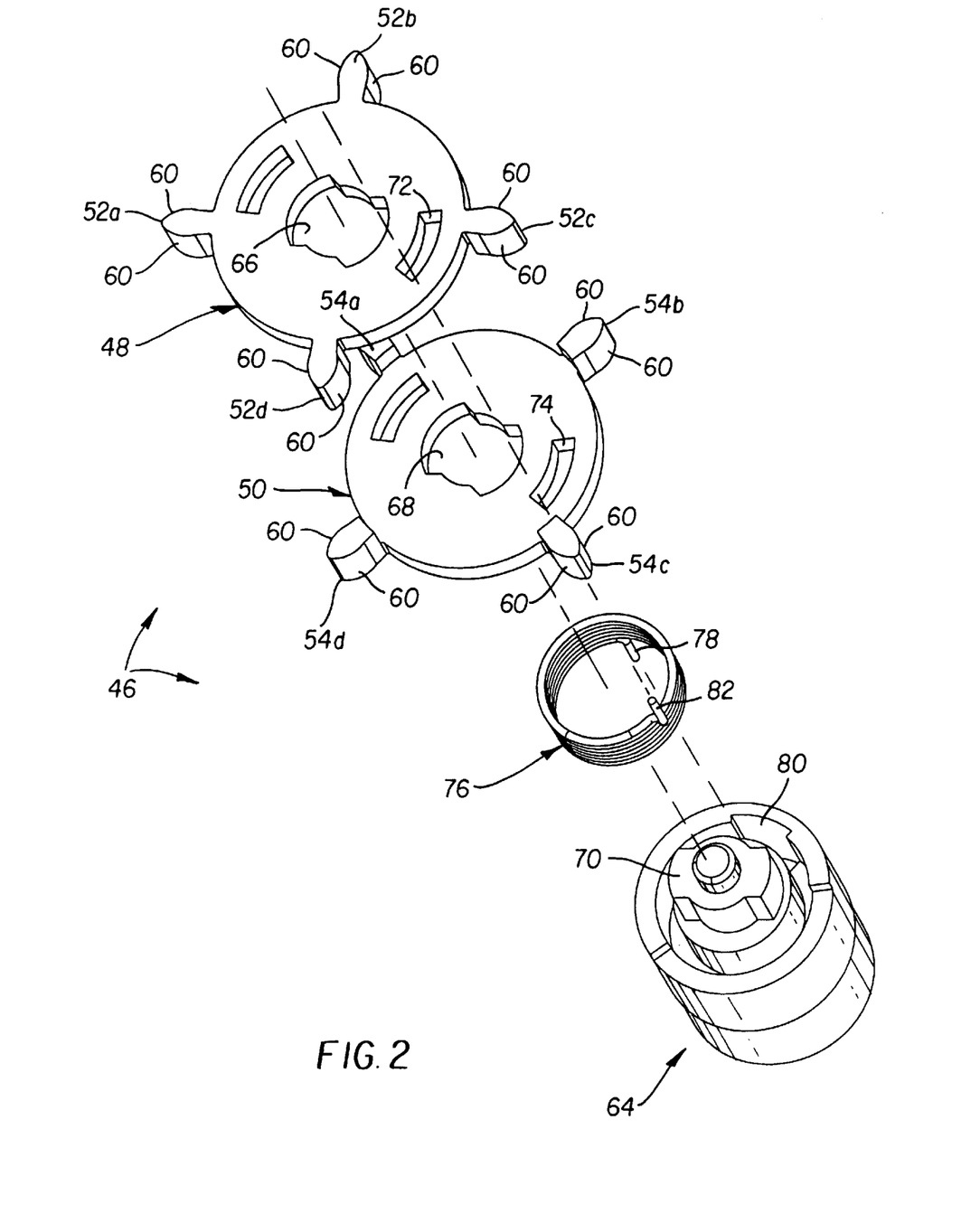
FIG. 2 is an exploded front perspective view of the sprocket drive.
Figure 3:
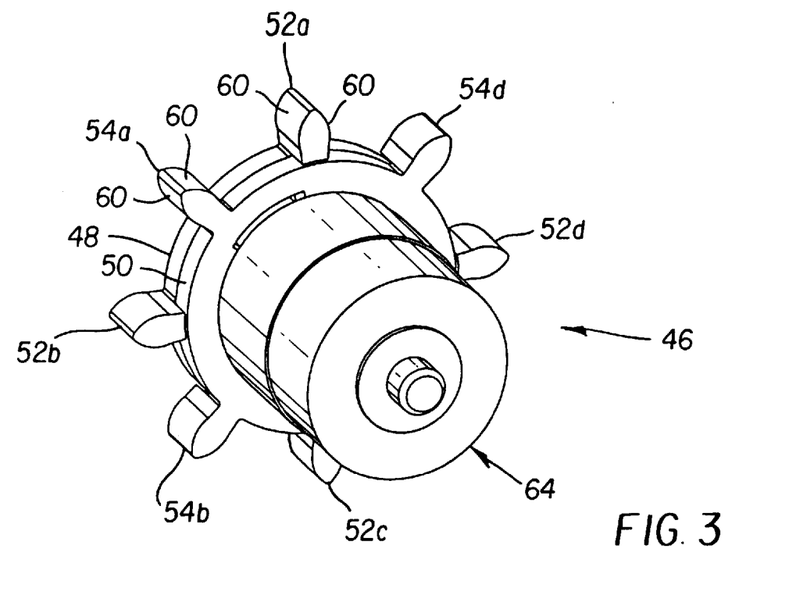
FIG. 3 is an assembled rear perspective view of the sprocket drive.
Figure 4:
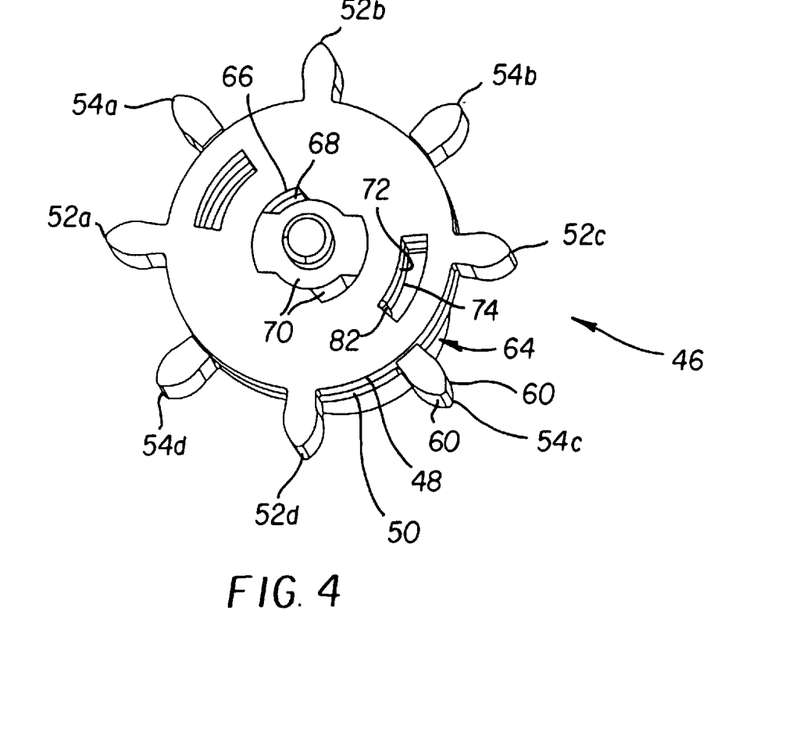
FIG. 4 is an assembled front perspective view of the sprocket drive.

As shown in FIG. 2, the four teeth 52a, 52b, 52c, 52d of the sprocket wheel 48 are 90° apart and the four teeth 54a, 54b, 54c, 54d of the sprocket wheel 50 are 90° apart. The two teeth in the respective pairs of teeth 52a–54a, 52b–54b, 52c–54c, 52d–54d are greater than 45° (though less than 90°) apart when the pitch 56 of the two teeth in the respective pairs of teeth is increased to greater than the pitch 14 of the film perforations 12a, 12b, 12c, etc. This is shown in FIGS. 5–9. Conversely, the two teeth in the respective pairs of teeth 52a–54a, 52b–54b, 52c–54c, 52d–54d are 45° apart when the pitch 56 of the two teeth in the respective pairs of teeth is decreased substantially to the pitch 14 of the film perforations 12a, 12b, 12c, etc. This is shown in FIGS. 9 and 10.

The teeth 52a, 52b, 52c, 52d of the sprocket wheel 48 project below the sprocket wheel in FIG. 2, and the teeth 54a, 54b, 54c, 54d of the sprocket wheel 50 project above the sprocket wheel in FIG. 2, in order that they form a continuous series of teeth that are substantially aligned (in a circle) to permit each one of the teeth to enter the film perforations. See FIG. 5.

A one-piece motor-driven rotatable drive hub 64, when not motor-driven, coaxially supports the sprocket wheels 48 and 50 to allow the sprocket wheels each to be rotated relative to the other to increase (as in FIGS. 6–9) and decrease (as in FIGS. 9–10) the pitch 56 of the two teeth in the respective pairs of teeth 52a–54a, 52b–54b, 52c–54c, 52d–54d. See FIGS. 2–5. The drive hub 64 is motor-driven as shown in FIG. 11 to uniformly rotate the sprocket wheels 48 and 50 when the pitch 56 of the two teeth in the respective pairs of teeth 52a–54a, 52b–54b, 52c–54c, 52d–54d is decreased substantially to the pitch 14 of the film perforations 12a, 12b, 12c, etc. The sprocket wheels 48 and 50 have a similar-shaped center opening 66 and 68, and the drive hub 64 has a substantially complimentary shaped integral key 70 that fits into both of the center openings. The key 70 is slightly smaller than the center openings 66 and 68 to allow the sprocket wheels 48 and 50 each to be rotated relative to the other a limited extent that is sufficient to increase the pitch 56 of the two teeth in the respective pairs of teeth 52a–54a, 52b–54b, 52c–54c, 52d–54d to greater than the pitch 14 of the film perforations 12a, 12b, 12c, etc.

Figure 7:
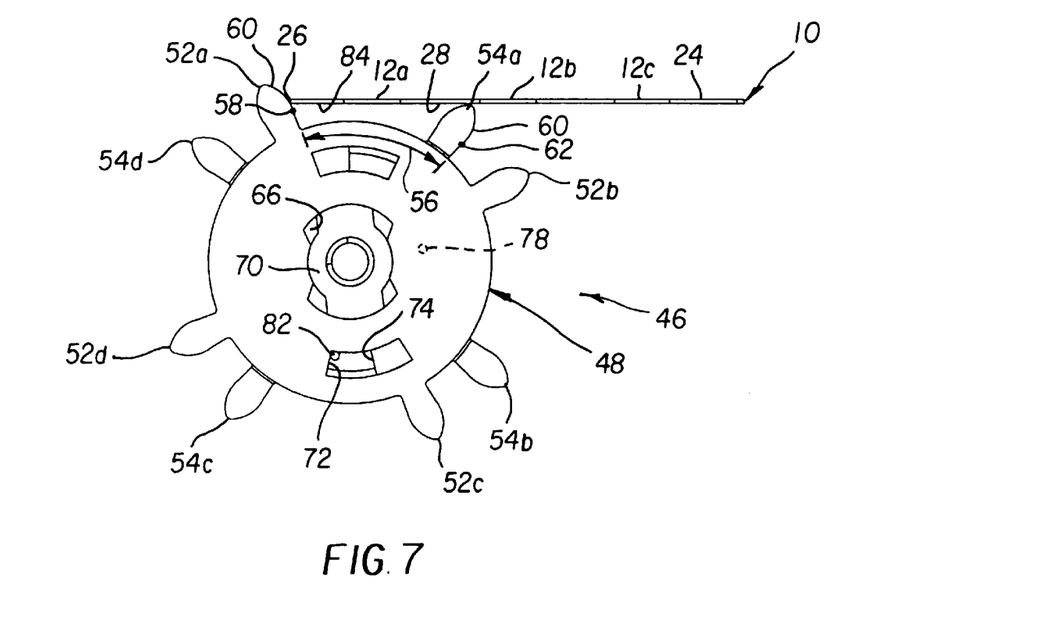
Figure 8:
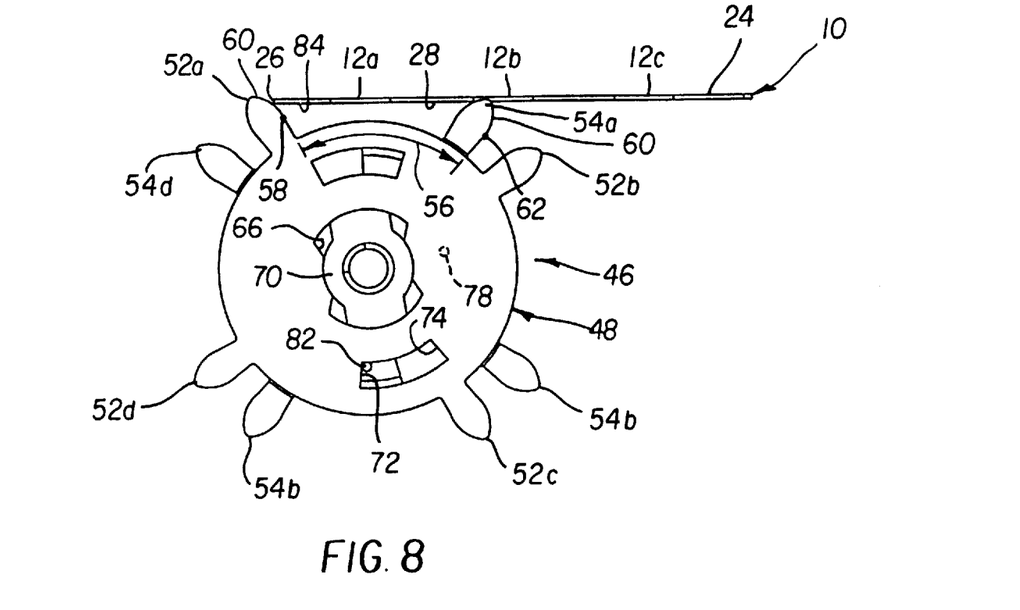
Figure 9:
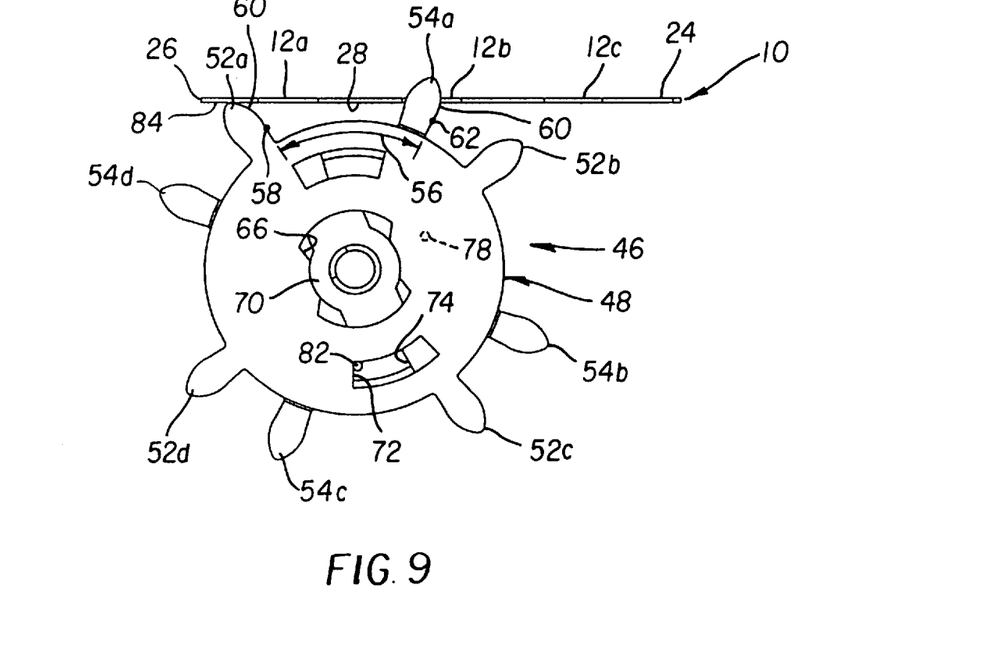

The sprocket wheels 48 and 50 have similar-length curved slots 72 and 74 that overlap one another completely when the drive hub uniformly rotates the sprocket wheels as shown in FIG. 11, and that overlap one another only partially as shown in FIGS. 7–9 when one sprocket wheel is rotated relative to the other sprocket wheel. A helical torsion return spring 76, shown in FIG. 2, has one spring leg 78 that is secured within a pocket 80 in the drive hub 64 and another spring leg 82 that projects into both of the curved slots 72 and 74, to urge rotation of one of the sprocket wheels 48 and 50 relative to the other sprocket wheel to decrease the pitch 56 of the two teeth in the respective pairs of teeth 52a–54a, 52b–54b, 52c–54c, 52d–54d substantially to the pitch 14 of the film perforations 12a, 12b, 12c, etc. This is shown in FIG. 10. The return spring 76 is compressed when one of the sprocket wheels 48 and 50 is rotated relative to the other sprocket wheel to increase the pitch 56 of the two teeth in the respective pairs of teeth 52a–54a, 52b–54b, 52c–54c, 52d–54d and expands to rotate one sprocket wheel relative to the other sprocket wheel to decrease the pitch of the two teeth in the respective pairs of teeth. See FIGS. 7–8 and 10.

Operation

Figure 6:
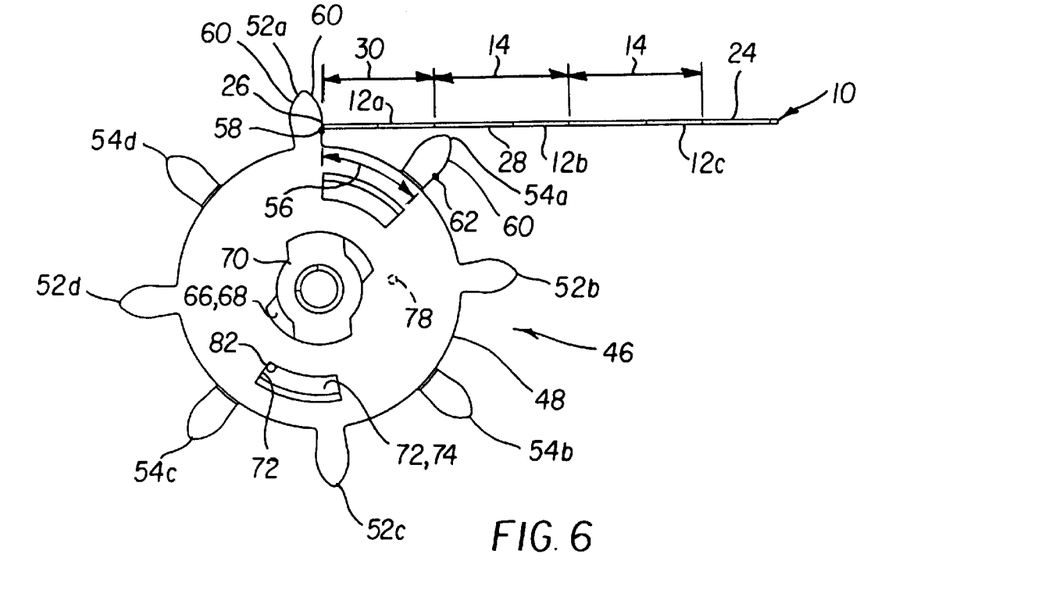
FIGS. 6, 7, 8, 9, 10 and 11 are front plan views of the sprocket drive with the film leader portion, illustrating operation of the sprocket drive.

FIGS. 5 and 6, the film leader 24 is manually inserted through the film entry zone 42 to advance the relieved edge portion 26 against the tooth 52a of the sprocket wheel 48.

In FIG. 7, the film leader 24 is further inserted through the film entry zone 42, which causes the relieved edge portion 26 then against the tooth 52a of the sprocket wheel 48 to begin to rotate that sprocket wheel and the sprocket wheel 50 counter-clockwise. The drive hub 64 remains stationary. When the tooth 54a of the sprocket wheel 50 is swung counter-clockwise against the underside section 28 of the film leader 24 between the first available perforation 12a and the second available perforation 12b, the tooth is restrained to halt rotation of that sprocket wheel counter-clockwise. The other sprocket wheel 48 continues to be rotated counter-clockwise, and is then rotated counter-clockwise relative to the sprocket wheel 50, which begins to increase the pitch 56 of the two teeth in the respective pairs of teeth 52a–54a, 52b–54b, 52c–54c, 52d–54d to greater than the pitch 14 of the film perforations 12a, 12b, 12c . . . , and begins to compress the return spring 76. This is shown in FIG. 7.

In FIG. 8, the film leader 24 is further inserted through the film entry zone 42, which causes the relieved edge portion 26 then against the tooth 52a of the sprocket wheel 48 to continue to rotate that sprocket wheel counter-clockwise relative to the sprocket wheel 50. Thus, the pitch 56 of the two teeth in the respective pairs of teeth 52a–54a, 52b–54b, 52c–54c, 52d–54d is further increased as compared to FIG. 7, and the return spring 76 is further compressed. Since the film leader 24 is further advanced in FIG. 8, the underside section 28 of the film leader between the first available perforation 12a and the second available perforation 12b is advanced from the tooth 54a of the sprocket wheel 50 and the second available perforation is advanced to that tooth. Once the tooth 54a of the sprocket wheel 50 is no longer restrained by the underside section 28 of the film leader 24 between the first and second available perforations 12a and 12b, the sprocket wheel is free to again rotate counter-clockwise, which will cause the tooth to enter the second available perforation.

In FIG. 9, the film leader 24 is further inserted through the film entry zone 42, which causes the relieved edge portion 26 then against the tooth 52a of the sprocket wheel 48 to briefly rotate the sprocket wheel 48 and the sprocket wheel 50 counter-clockwise. The relieved edge portion 26 of the film leader 24 is advanced beyond the tooth 52a of the sprocket wheel 48, and the tooth 54a of the sprocket wheel 50 enters the second available perforation 12b. The spring leg 82 of the return spring 76, which then biases the sprocket wheel 48 clockwise, urges the tooth 52a of that sprocket wheel against an underside section 84 of the film leader 24 between the relieved edge portion 26 and the first available perforation 12a. FIG. 9 shows the sprocket wheel 50 rotated counter-clockwise relative to the sprocket wheel 48, because of engagement of the tooth 54a of that sprocket wheel with the film leader 24. Thus, the pitch 56 of the two teeth in the respective pairs of teeth 52a–54a, 52b–54b, 52c–54c, 52d–54d begins to decrease, although in FIG. 9 the pitch of the two teeth in the respective pairs of teeth remains greater than the pitch 14 of the film perforations 12a, 12b, 12c, etc.

In FIG. 10, the film leader 24 is further advanced through the film entry zone 42 to advance the first available perforation 12a to the tooth 52a of the sprocket wheel 48. The spring leg 82 of the return spring 76 rotates the sprocket wheel 48 clockwise relative to the sprocket wheel 50 to cause the tooth 52a of the former sprocket wheel to enter the first available perforation 12a and to decrease the pitch 56 of the two teeth in the respective pairs of teeth 52a–54a, 52b–54b, 52c–54c, 52d–54d substantially to the pitch 14 of the film perforations 12a, 12b, 12c, etc.

In FIG. 11, the film door 40 has been closed and the switch (not shown) is closed to motor-rotate the sprocket drive 46 in engagement with the film leader 24 to advance the film leader 24 to the film take-up spool in the film take-up chamber (not shown) in the main body part 34. The sprocket wheels 48 and 50 are uniformly rotated counter-clockwise in FIG. 11.

The invention has been described with reference to a preferred embodiment. However, it will be appreciated that variations and modifications can be effected by a person of ordinary skill in the art without departing from the scope of the invention.

Parts List 10. filmstrip
12a–c. film perforations (first and second available perforations 12a and 12b)
14. pitch
16. sprocket wheel
18a–h. teeth
20. pitch
22. leading edge
24. film leader
26. relieved edge portion
28. underside section
30. distance
32. camera
34. main body part
36. cartridge receiving chamber
38. film cartridge
40. film door
42. film entry zone
44. rear cover part
46. sprocket drive
48. sprocket wheel
50. sprocket wheel
52a–d. teeth
54a–d. teeth
56. pitch/distance
58. point
60. curved face
62. corresponding point
64. drive hub
66. center opening
68. center opening
70. key
72. slot
74. slot
76. return spring
78. spring leg
80. pocket
82. spring leg
84. underside section

What is claimed is:

1. A film-engaging sprocket drive for use with an edge-perforated filmstrip having successive uniform-pitch film perforations, said sprocket drive comprising:

a set of two coaxial sprocket wheels each having a series of uniform-pitch film-engaging teeth that are similarly shaped to engage the filmstrip within the film perforations and that are arranged in successive pairs of one tooth from one sprocket wheel and another tooth from the other sprocket wheel, and said sprocket wheels each are rotatable relative to the other to similarly increase the pitch of the two teeth in said respective pairs of teeth to greater than the pitch of the film perforations; and a return spring arranged to rotate one sprocket wheel relative to the other sprocket wheel to decrease the pitch of the two teeth in said respective pairs of teeth substantially to the pitch of the film perforations.

2. A film-engaging sprocket drive as recited in claim 1, wherein said teeth of one sprocket wheel are 90° apart, said teeth of the other sprocket wheel are 90° apart, and the two teeth in said respective pairs of teeth are greater than 45° apart when the pitch of the two teeth in said respective pairs of teeth is increased to greater than the pitch of the film perforations and are 45° apart when the pitch of the two teeth in said respective pairs of teeth is decreased substantially to the pitch of the film perforations.

3. A film-engaging sprocket drive as recited in claim 1, wherein a rotatable drive hub coaxially supports said sprocket wheels to allow the sprocket wheels each to be rotated relative to the other to increase and decrease the pitch of the two teeth in said respective pairs of teeth and to uniformly rotate said sprocket wheels when the pitch of the two teeth in said respective pairs of teeth is decreased substantially to the pitch of the film perforations.

4. A film-engaging sprocket drive as recited in claim 3, wherein said return spring is a helical torsion spring having one spring leg at said drive hub and another spring leg at said sprocket wheels to urge rotatation of one sprocket wheel relative to the other sprocket wheel to decrease the pitch of the two teeth in said respective pairs of teeth substantially to the pitch of the film perforations.

5. A film-engaging sprocket drive as recited in claim 3, wherein said sprocket wheels each have a similar-shaped center opening, and said drive hub has a complimentary shaped key that fits into both of the center openings and is smaller than said center openings to allow the sprocket wheels each to be rotated relative to the other a limited extent that is sufficient to increase the pitch of the two teeth in said respective pairs of teeth to greater than the pitch of the film perforations.

6. A film-engaging sprocket drive as recited in claim 5, wherein said sprocket wheels have similar-length slots that overlap one another completely when said drive hub uniformly rotates said sprocket wheels and overlap one another only partially when one sprocket wheel is rotated relative to the other sprocket wheel, and said return spring is a helical torsion spring having one spring leg at said drive hub and another spring leg in both of said slots to urge rotation of one sprocket wheel relative to the other sprocket wheel to decrease the pitch of the two teeth in said respective pairs of teeth substantially to the pitch of the film perforations.

7. A film-engaging sprocket drive as recited in claim 7, wherein said helical torsion spring is compressed when one sprocket wheel is rotated relative to the other sprocket wheel to increase the pitch of the two teeth in said respective pairs of teeth and expands to rotate one sprocket wheel relative to the other sprocket wheel to decrease the pitch of the two teeth in said respective pairs of teeth.

8. A film-engaging sprocket drive comprising:
a set of two coaxial sprocket wheels each having a similarly shaped center opening and a series of uniform-pitch film-engaging teeth that are similarly shaped and that are arranged in successive pairs of one tooth from one sprocket wheel and another tooth from the other sprocket wheel, and said sprocket wheels each are rotatable relative to the other to similarly increase and decrease the pitch of the two teeth in said respective pairs of teeth;
a rotatable drive hub having a coaxial key that is complimentary shaped in regard to the center openings to fit into both of said center openings to allow said sprocket wheels each to be rotated relative to the other a limited extent that is sufficient to increase the pitch of the two teeth in said respective pairs of teeth; and
a return spring arranged to rotate one sprocket wheel relative to the other sprocket wheel to similarly decrease the pitch of the two teeth in said respective pairs of teeth.

9. A film-engaging sprocket drive as recited in claim 8, wherein said key when in both of said center openings allows said return spring to rotate one sprocket wheel relative to the other sprocket wheel to decrease the pitch of the two teeth in said respective pairs of teeth to only one-half of the pitch of said teeth of one sprocket wheel and said teeth of the other sprocket wheel.

10. An edge-perforated filmstrip having successive uniform-pitch film perforations, and a film-engaging sprocket drive including a set of two coaxial sprocket wheels each having a series of uniform-pitch film-engaging teeth that are similarly shaped to engage said filmstrip within said film perforations and that are arranged in successive pairs of one tooth from one sprocket wheel and another tooth from the other sprocket wheel, and said sprocket wheels each are rotatable relative to the other to similarly increase the pitch of the two teeth in said respective pairs of teeth to greater than the pitch of said film perforations and to similarly decrease the pitch of the two teeth in said respective pairs of teeth substantially to the pitch of said film perforations.

11. A film-engaging sprocket drive for use with an edge-perforated filmstrip having successive uniform-pitch film perforations, said sprocket drive comprising:
a set of two coaxial sprocket wheels each having a series of at least partially curved face uniform-pitch film-engaging teeth that engage the filmstrip within the film perforations and that are arranged in successive pairs of one tooth from one sprocket wheel and another tooth from the other sprocket wheel, and said sprocket wheels each are rotatable relative to the other to similarly increase the distance between a point on said face of one of the two teeth in said respective pairs of teeth and a corresponding point on said face of the other tooth in the same pair to similarly increase the pitch of the two teeth in said respective pairs of teeth to greater than the pitch of the film perforations; and
a return spring arranged to rotate one sprocket wheel relative to the other sprocket wheel to similarly decrease the distance between the point on said face of one of the two teeth in said respective pairs of teeth and the corresponding point on said face of the other tooth in the same pair to decrease the pitch of the two teeth in said respective pairs of teeth substantially to the pitch of the film perforations.

12. A method of engaging a sprocket drive with an edge-perforated filmstrip, comprising:
rotating one of two identical multi-tooth sprocket wheels relative to the other sprocket wheel to position one tooth of the one sprocket wheel in a second available perforation in the filmstrip; and
rotating the other sprocket wheel relative to the one sprocket wheel to position one tooth of the other sprocket wheel in a first available perforation in the filmstrip which precedes the second available perforation.

13. A method as recited in claim 12, wherein the teeth of the one sprocket wheel and the teeth of the other sprocket wheel are arranged in successive pairs of one tooth from the one sprocket wheel and another tooth from the other sprocket wheel, the other sprocket wheel is rotated relative to the one sprocket to increase the pitch of the two teeth in the respective pairs of teeth to greater than the pitch of the film perforations to allow one tooth of the one sprocket wheel to be positioned in the second available perforation in the filmstrip, and the other sprocket wheel is reverse-rotated relative to the one sprocket wheel to decrease the pitch of the two teeth in the respective pairs of teeth substantially to the pitch of the film perforations in order to position one tooth of the other sprocket wheel in the first available perforation in the filmstrip.

14. A method as recited in claim 13, wherein the two teeth in the respective pairs of teeth are separated more than 45° apart when the other sprocket wheel is rotated relative to the one sprocket to increase the pitch of the two teeth in the respective pairs of teeth to greater than the pitch of the film perforations, and the two teeth in the respective pairs of teeth are returned to being 45° apart when the other sprocket wheel is reverse-rotated relative to the one sprocket to decrease the pitch of the two teeth in the respective pairs of teeth substantially to the pitch of the film perforations.

* * * * *